Dec. 27, 1955   W. A. HARAMIC   2,728,230
TIRE PRESSURE INDICATOR
Filed Oct. 1, 1953   4 Sheets-Sheet 2

INVENTOR.
WALTER A. HARAMIC.
BY Archworth Martin
his ATTORNEY.

Dec. 27, 1955 W. A. HARAMIC 2,728,230
TIRE PRESSURE INDICATOR
Filed Oct. 1, 1953 4 Sheets-Sheet 3

INVENTOR.
WALTER A. HARAMIC.
BY Archworth Martin
his ATTORNEY.

Dec. 27, 1955  W. A. HARAMIC  2,728,230
TIRE PRESSURE INDICATOR
Filed Oct. 1, 1953  4 Sheets-Sheet 4

INVENTOR.
WALTER A. HARAMIC.
BY Anchworth Martin
his ATTORNEY.

United States Patent Office 2,728,230
Patented Dec. 27, 1955

2,728,230

TIRE PRESSURE INDICATOR

Walter A. Haramic, Pittsburgh, Pa.

Application October 1, 1953, Serial No. 383,446

2 Claims. (Cl. 73—390)

This invention relates to pressure-indicating devices that are particularly suitable for use with pneumatic-tired trucks and trailers, as well as with tires of aircraft landing wheels, and while it is herein shown and described as designed for use with wheels having twin pneumatic tires, it is useful also for single-tired wheels.

A truck driver frequently proceeds along a highway unaware of the fact that one tire of a twin-tread, for example, has become punctured, until after so much heat has been developed through overload on the associated tire as to cause an accident or explosion and fire. There have been many instances where trucks and their lading have been burned under such conditions. Also, when aircraft land with their tires deflated, unknown to the aviator, he cannot adjust his line of approach to the field, to compensate for the "drag" at one side, especially if he does not know which wheel has the flat tire.

The invention has for one of its objects the provision of indicating devices which, while they are visible in the driver's cab, will accurately indicate the pressure conditions within the tire of a vehicle, and wherein there are no movable joints or connections through which air can leak, notwithstanding the fact that the indicators will be mounted in the operator's cab and the pressure-indicator controls are carried by the wheels as they rotate.

Another object of my invention is to provide a control unit that can readily be applied to standard types of vehicle wheels, without substantial alterations of the wheels or their tires.

As shown in the accompanying drawing, Figure 1 is a side view of the unit as seen at the outer face of a wheel;

Fig. 4 is a view taken on the line IV—IV of Fig. 1;

Figure 1:
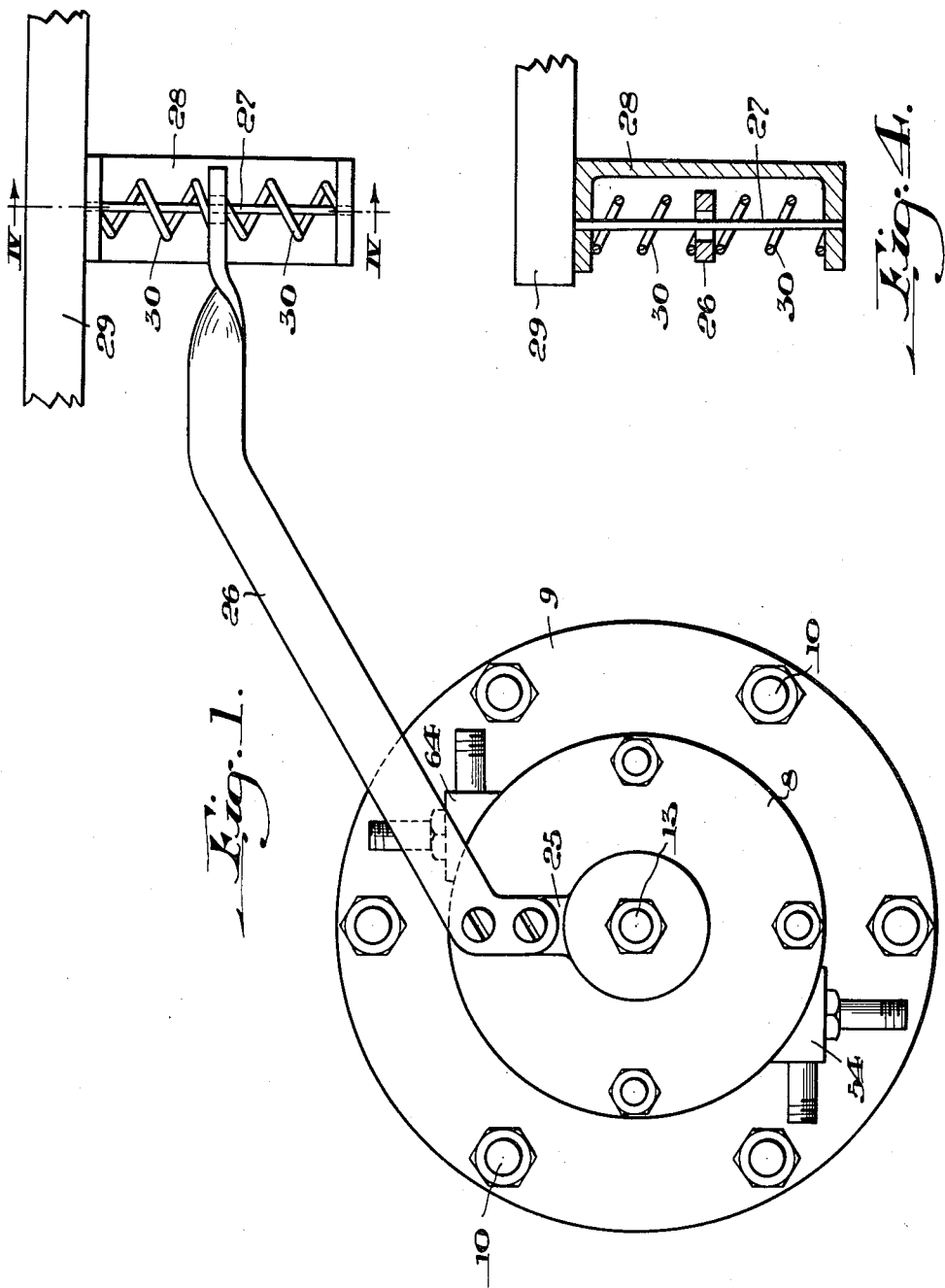

While the invention is here shown as employed more particularly in connection with vehicle wheels having twin pneumatic tires, it will be understood that it can be also used with wheels, each of which has only a single pneumatic tire. The apparatus comprises a casing 8 connected to a base plate 9 that will be connected by cap screws 10 to the hub 11 of a vehicle wheel. An arbor member 13 of stud-like form serves as a support for three race rings 14, 15 and 16 of a ball-bearing assembly, these rings being insulated from the stud 13 by a sleeve 17.

Outer ball races 18, 19 and 20 surround bearing balls 21 that are interposed between the inner and outer races. An insulating sleeve 22 is interposed between the outer races and a housing 23, the member 23 and its contained parts being held in place by the arbor member 13 that is secured to a cover plate 24.

A flange 25 on the housing 23 is riveted to an arm 26 that will extend to some point beneath the vehicle frame as shown in Figs. 1 and 4 where a guide rod 27 extends through it, the rod 27 being carried by a channel bracket 28 that is secured to the underframe 29 of a vehicle. Springs 30 are employed to yieldably cushion the arm 26 and thus allow for vertical movements of the truck body relative to the axle, and serving, of course, to hold the housing 23 against rotation during turning of the wheel 11 when the truck is running. The casing 8 and the inner ball races 14, 15 and 16 turn as a unit with the wheel 11. Electrical conductors 31, 32 and 33 are welded to the ball races 18, 19 and 20 respectively, and current is conducted therefrom through the balls and the inner races 14—15—16 to conductors 34, 35 and 36 that are connected to the inner races. The ball races are insulated from each other by discs 38.

Figure 5:
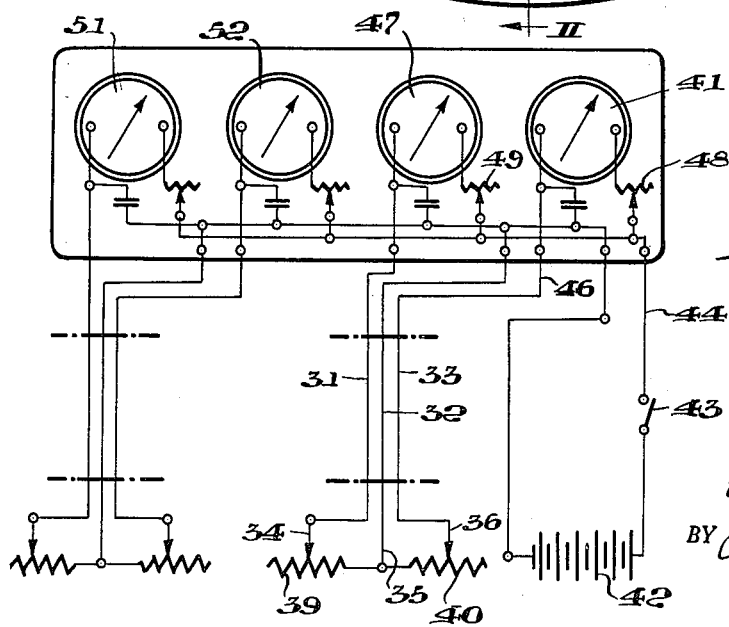
Fig. 5 is a wiring diagram of the signal system when employed in connection with two rear wheels each of which has a pair of pneumatic tires.

Variable resistors are provided at 39 and 40 to vary current flow through potentiometers at 41 and 47. From a battery 42, current will flow past a manually-operated switch 43 through a conductor 44 to one side of each of the potentiometers shown in Fig. 5. From one potentiometer 41 of a pair, the current will flow through a conductor 46 to the variable resistor at 40 that is controlled by pressure in one tire, and from the associated potentiometer 47, the current will flow through the conductor 31 to the variable resistor 39 that is acted upon by the pressure in the other tire of the pair, so that the positions of the indicator hands will be determined by the degree of resistance that will be varied in a manner to be hereinafter described. Adjustable resistors 48 and 49 are provided for the potentiometers 41 and 47 so as to permit setting of indicator hands to neutral or zero positions when there is a desired degree of normal pressure in the tires.

The wiring for the indicator circuits 41 and 47 that are associated with one pair of pneumatic tires is the same for indicators 51 and 52 which will be associated with the pair of pneumatic tires on the other wheel of the truck.

One pneumatic tire of the wheel 11 has a hose or pipe 53 connected through a valve block 54 to a filling valve at 55 that may be of the usual form. A bellows 56 is tightly connected to the valve block 54, and at its upper end has sealed engagement with a cap plate 57. A rack stem 58 extends into the valve block with tight fitting fixed engagement with the plate 57, so that it will be moved when the bellows is expanded against its inherent resiliency through increases in pressure within the tire and in the valve block. The teeth 59 of the rack mesh with pinion teeth 60 of a shaft that, at its inner end, carries a terminal block 61 which, in turn, carries the contact member 34 that engages the resistor 39. As the shaft is oscillated by the rack gearing, the resistance at 39 will be varied and the degree of variation registered at the potentiometer 47.

A second control device comprising a valve block 64, bellows 65 and rack gearing at 68, in duplication of the resistor operating mechanism just described, is provided for the other tire on this wheel, for actuation of the resistor at 36—40 to control the other potentiometer 41.

If a tire becomes punctured, the pressure in the bellows 56 will be decreased, thus causing the bellows to contract and the shaft 60 to be turned in a direction to so vary the resistance at 40, for example, as to cause the indicator at 41 to show this decrease. Similarly, if the other tire becomes deflated, there will be an indication thereof at the potentiometer 47.

If, on the other hand, the pressure becomes too great in a tire, the bellows will be expanded to move the resistor for that tire in a direction to show this increase of pressure on its associated potentiometer. The potentiometers will, of course, be mounted in the cab of the vehicle.

Figure 2:
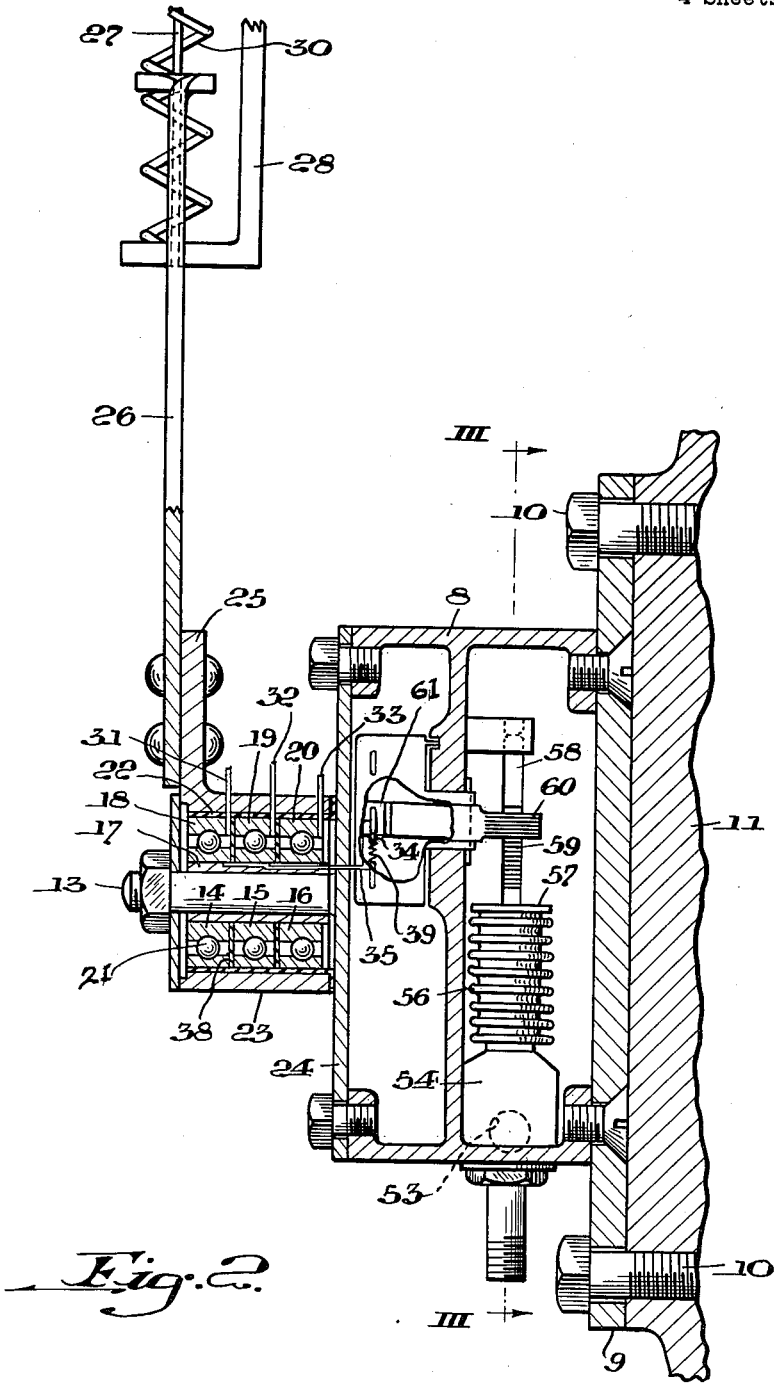
Fig. 2 is a sectional view therethrough, taken on the line II—II of Fig. 3.
Figure 3:
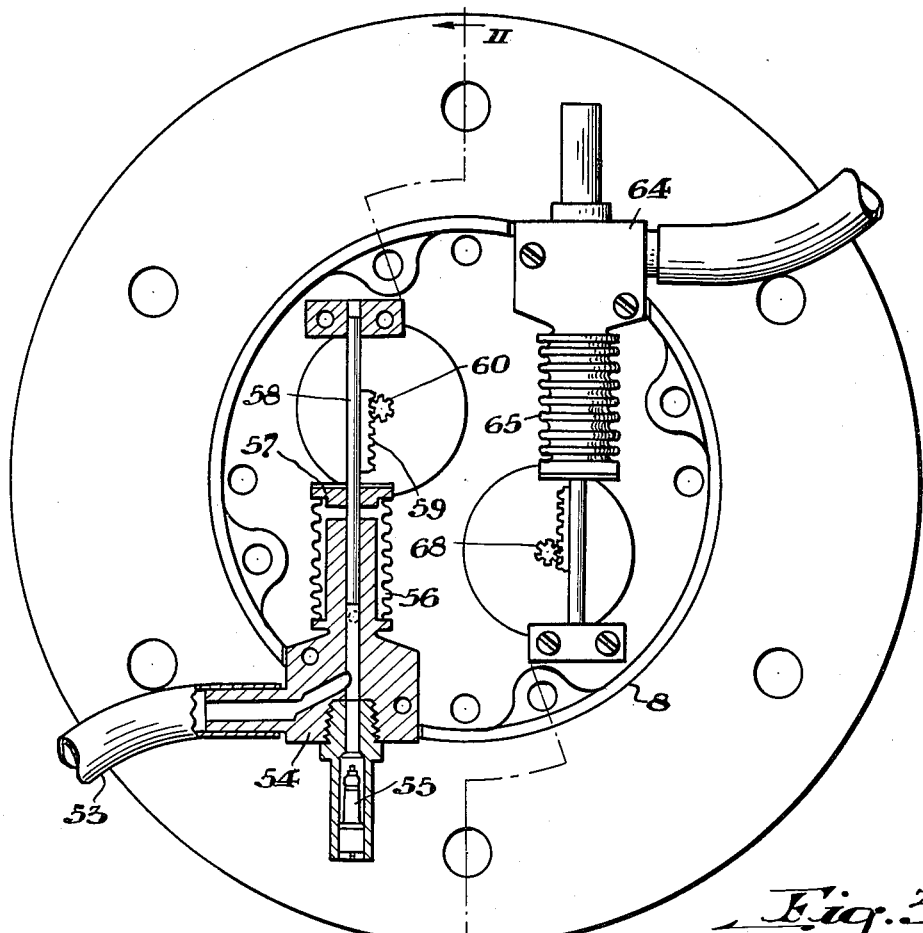
Fig. 3 is an enlarged face view of the structure of Fig. 1, with some of the parts broken away, and taken on the line III—III of Fig. 2.
Figure 6:
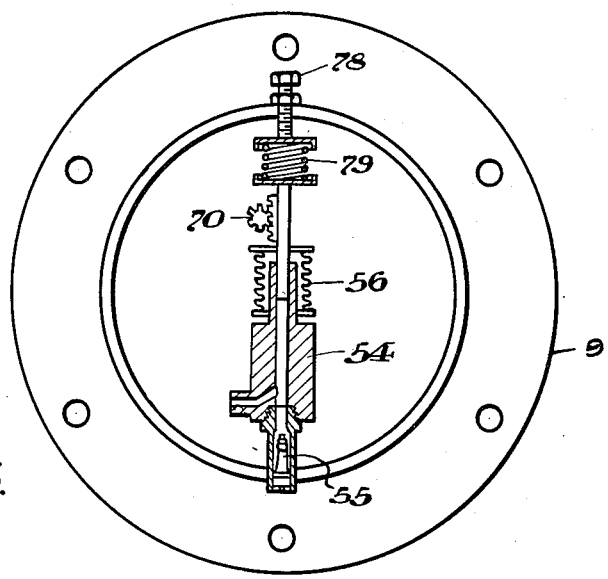
Fig. 6 shows a modification of the structure of Figs. 1 to 3.
Figure 7:
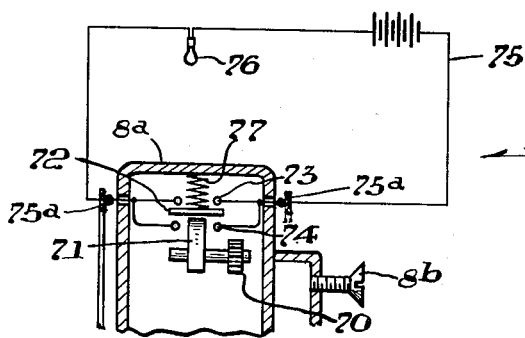
Fig. 7 shows a wiring diagram for an alarm system that may be employed therewith.

Referring now to Figs. 6 and 7, I show a simplified arrangement whereby the rack-and-pinion drive 70, which corresponds to and is operated in the same manner as the rack-and-pinion structure of Fig. 3, turns a cam 71 that operates a switch member 72 which will make and break a circuit at pairs of contact members 73 and 74 of a circuit 75. These parts are in a casing 8a that rotates with a wheel to which it will be secured by the base plate 9 and screws 8b as is the casing 8 of Fig. 2. When the tire pressure exceeds a predetermined degree, the rack will be turned to close the switch at 72—73 and effect illumination of a signal lamp 76 may be mounted on the instrument panel of a vehicle. Contrariwise, when the pressure falls to a dangerously low degree, the bellows will contract and thereby turn the rack in a direction to allow movement of the switch member 72, under pressure of a spring 77 into engagement with the contacts 74, thereby also illuminating the signal lamp.

The conductors to which the switch contact members 73 and 74 are connected extend through insulating bushings in the side walls of 8a, and at their extremities have brushing engagement with rings 75a that form part of the circuit 75, thus permitting of a constant electrical circuit during rotation of the wheel and the casing. The rings 75a will be connected to the vehicle body by any suitable means such as the bracket arm 26.

An adjusting screw 78 operating through a spring 79 is employed for setting the control apparatus to a point at which the normally-desired air pressure in the tire is such that the diaphragm 56 will be at a position where the cam shaft holds the cam at an intermediate or neutral position, with the switch member 72 out of engagement with the contact members. The adjusting device at 78—79 can, of course, be applied to the control apparatus of Figs. 1 to 5.

Figure 8:
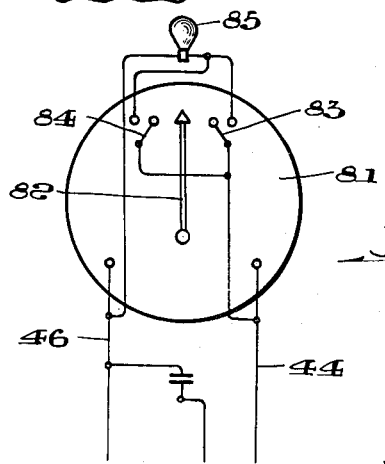
Fig. 8 shows a modification that includes both dial and lamp signals.

In Fig. 8, I show a combined arrangement of signal lamp and potentiometer, because an illuminated red lamp for example will more surely attract the driver's attention than movement of a potentiometer indicator hand. In this case, the potentiometer 81 corresponds to the potentiometer 41, for example, and is operated in the same manner. However, the indicator hand 82 is utilized to selectively close switches 83 and 84 to complete the circuit through a lamp 85, so that either at an abnormally high or at an abnormally low tire pressure, the lamp will be illuminated.

The control apparatus, in its various forms, can be sold as a unit with the base plate 9, for attachment to vehicle wheels, it being necessary only to provide plates having bolt holes of various spacings to suit the tapped holes of wheels to which they will be applied.

It will be understood also that warning bells can be substituted for the lamps, where audible signalling is desired.

I claim as my invention:

1. Signalling apparatus for each of two pneumatic tires on a twin-tread wheel, comprising a casing having a base at its inner end with means for rigidly connecting it in coaxial relation to the outer face of a wheel, a cover plate for the outer end of the casing, an arbor carried by the cover plate and projecting outwardly therefrom in coaxial relation to the casing, three pairs of ball race rings in axially-alined relation on the arbor, with balls between the rings of each pair and serving to conduct electrical current from each ring to its paired ring, one ring of each pair being rotatable with the arbor and the other being stationary, a pair of bellows in the casing each having a pipe for connection to a tire valve stem, a movable conductor leading from the rotatable ring of one pair of rings into the casing, a resistor engaged by the said conductor and connected electrically to the rotatable ring of a second pair of races, means operated by one of the bellows for moving the conductor along the resistor, a second conductor leading from the stationary ring of said second pair of races to a source of current that is connected also to a signalling device, a third conductor leading from the signalling device to the stationary ring of said one pair of ball race rings, a second resistor having a conductor connected to the rotatable ring of the second pair of ball race rings, a conductor movable on the last-named resistor by the other bellows and connected to the rotatable ring of the third pair of ball race rings and a conductor leading from the stationary ring of said third pair to a second signalling device which is, in turn, connected to the source of current.

2. Signalling apparatus for each of two pneumatic tires on a twin-tread wheel, comprising a casing having a base at its inner end with means for rigidly connecting it in coaxial relation to the outer face of a wheel, a cover plate for the outer end of the casing, an arbor carried by the cover plate and projecting outwardly therefrom in coaxial relation to the casing, three pairs of conductor elements carried by the arbor, one conductor of each pair being of circular form coaxially of the arbor and in electrical engagement with the other conductor element of each pair, and one element of each pair being rotatable with the arbor and the wheel, the other element of each pair being held against rotation, two bellows in the casing, each having a pipe for connection to a tire valve stem, a movable conductor leading from the rotatable element of one of said pairs into the casing, a resistor engaged by the said conductor and connected electrically to the rotatable element of a second pair of conductor elements, means operated by one of the bellows for moving the conductor along the resistor, a second conductor leading from the stationary element of said second pair of conductor elements to a source of current that is connected also to a signalling device, a third conductor leading from the source of current through the said signalling device to the stationary element of said one pair of conductor elements, a second resistor having a conductor connected to the rotatable element of the third pair of conductor elements, a conductor movable on the last-named resistor by the other bellows and connected to the rotatable element of the third pair of conductor elements, and a conductor leading from the stationary element of said third pair to a second signalling device which is, in turn, connected to the source of power.

References Cited in the file of this patent

UNITED STATES PATENTS

| | | |
|---|---|---|
| 1,652,733 | Rouch et al. | Dec. 13, 1927 |
| 2,145,363 | Miller | Jan. 31, 1939 |
| 2,248,047 | Addy et al. | July 8, 1941 |
| 2,269,083 | Langsam et al. | Jan. 6, 1942 |
| 2,480,855 | Hatcher | Sept. 6, 1949 |
| 2,510,785 | Potts et al. | June 6, 1950 |
| 2,529,813 | Potts | Nov. 14, 1950 |
| 2,630,013 | Schier, Jr., et al. | Mar. 3, 1953 |